E. P. ROBINSON.
POWER VALVE GEAR.
APPLICATION FILED MAY 9, 1913.
1,126,657.
Patented Jan. 26, 1915.
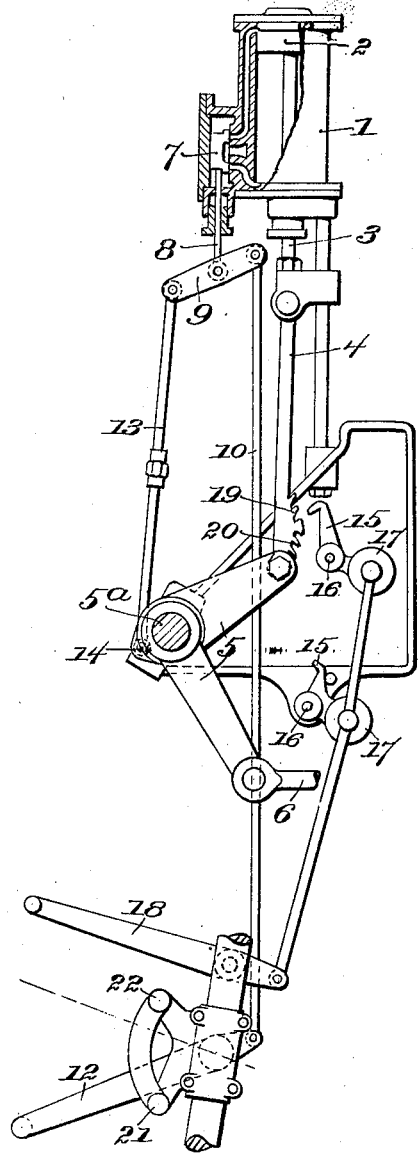
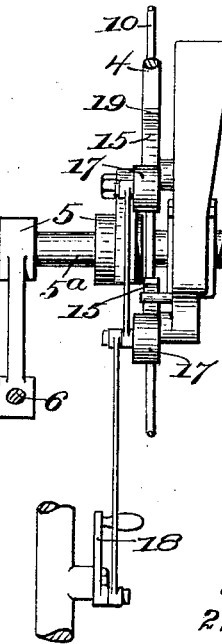
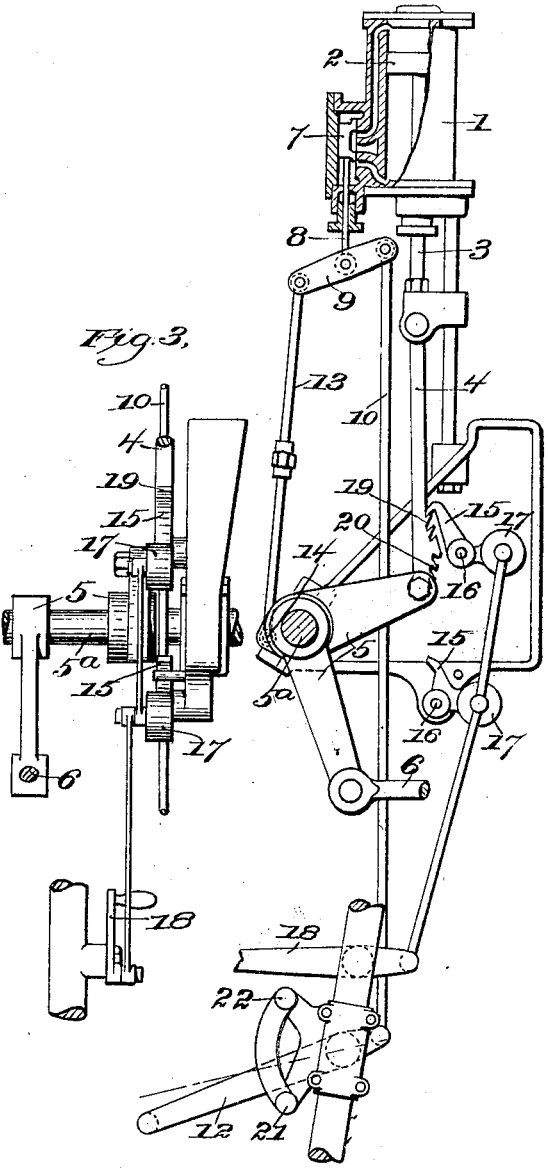

UNITED STATES PATENT OFFICE.

EDWARD P. ROBINSON, OF MALDEN, MASSACHUSETTS.

POWER VALVE-GEAR.

1,126,657.　　　Specification of Letters Patent.　　Patented Jan. 26, 1915.

Application filed May 9, 1913. Serial No. 766,488.

*To all whom it may concern:*

Be it known that I, EDWARD P. ROBINSON, a citizen of the United States, residing in Malden, in the county of Middlesex and State of Massachusetts, have invented an Improvement in Power Valve-Gear, of which the following description, in connection with the accompanying drawings, is a specification, like letters on the drawings representing like parts.

The present invention relates to a power valve gear, and is embodied in a valve gear of that kind which is operated by floating levers, the cylinder which supplies the power to operate the gear being controlled by a valve which is primarily actuated by a manually operated lever, and secondarily operated by an interconnecting mechanism between the valve and the gear which is being operated, so that the said valve is automatically shifted when the gear has reached a position corresponding to the position of the manually controlled valve actuating device.

It is the purpose of the present invention to provide such a gear with means for holding the gear in intermediate positions, and this is accomplished by combining the floating lever mechanism for the valve with a positive locking device which holds the gear in position after it has been moved by the piston to the position desired. This fastening device may be automatic in its release operation, so that it releases itself as soon as it is desired to make a change in running conditions, it being practicable to utilize a latching pawl to serve the purpose.

Figure 1 is an elevation, partly in section, of a valve gear embodying the invention; Fig. 2 is a similar view showing the parts in a different position; and Fig. 3 is a partial elevation taken at a right angle to the plane of Fig. 1.

The motor for the valve gear is shown as a cylinder 1 having a piston 2, the piston-rod 3 of which is connected by a connecting rod 4 with an elbow lever or bell crank 5 having a rod 6 by which is actuated the link motion or other reversing gear not shown. In the construction shown, the elbow lever consists of two offset arms mounted on a rock-shaft 5ª, as shown in Fig. 3. This elbow lever is operated by steam or compressed air, and the movement of the piston 2 in one direction or the other is controlled by a D valve 7 of the usual construction. The operating rod 8 for the said D valve, which rod passes through a suitable stuffing box, is connected with an equalizing lever 9 between the ends thereof, one end of said lever being connected by a rod 10 with the manually actuated lever 12 which will be hereinafter referred to as the reversing lever. The other end of the lever 9 is connected by means of a rod 13 with a part of the elbow lever 5, said rod being herein shown as connected with the wrist-pin 14. This is substantially the same as the floating lever construction now commonly employed, the movement of the reversing lever 12 when the valve gear is stationary, causing a movement of the lever 9 on the end of the rod 13 as a pivot, and thereby opening the D valve 7 to admit fluid pressure to one end of the cylinder 1, and open the exhaust port at the other end thereof. The position of the end of the lever 9 to which the rod 10 is connected is determined by the position of the reversing lever 12, and as the elbow lever 5 moves in response to the movement of the piston 2, the rod 13 rocks the lever 9, on the end of the rod 10 as a pivot, thereby automatically closing the valve 7 without further movement of the reversing lever 12.

In accordance with the invention, the apparatus is provided with a positive locking device of simple construction which can be easily put in operation to hold the reversing gear in any position of cut off, the said device being automatic in its unlocking action, so that the parts are released when the reversing lever is operated, to cause a movement of the piston from the position in which it is being held. In the construction shown, pawls 15 are employed for this purpose, there being two of such pawls, one of which is adapted to hold the parts in position when the engine is reversed and linked up, and the other to hold the parts when the engine is running ahead and linked up. These pawls are shown as mounted on pivots 16 and provided with weighted ends 17, so that they naturally fall to the position shown in Fig. 1, being rocked on the said pivots, however, by means of an actuating handle 18. These pawls coöperate, respectively, with sets of teeth 19 and 20, connected with or formed on the connecting rod 4 through which the piston 2 operates.

Assuming, for example, that the engine is running full speed ahead, with the parts in the position shown in Fig. 1, and it is desired to link up the engine, or, in other words, provide for an earlier cut-off, the reversing lever 12 is moved on its pivot away from the stop 21, thus moving the valve 7 downward, and admitting pressure to the upper end of the cylinder 1, causing a downward movement of the piston. This movement is communicated to the elbow lever 5 and the reversing mechanism brings about the closure of the valve 7 through the action of the lever 9 in the usual way. The upper pawl 15 is then moved, through the agency of the lever 18, so that it is in position to engage one of the teeth 19, as shown in Fig. 2, the D valve 7 then being in its neutral position with both ports closed. The reversing lever 12 is then moved back to its original full speed ahead position, thus producing an upward movement of the rod 10 which throws the D valve open to the lower end of the cylinder, thus admitting pressure to the under side of the piston 2, so that the latter pulls upward against the pawl 15, holding the said pawl locked, owing to the action of the full pressure on the piston 2 in one direction, and the mechanical resistance of the pawl 15 in the other direction. With the parts in this position, the pawl 15 will be at once released when the reversing lever 12 is thrown over, as such movement will reverse the slide valve 7, admitting pressure to the top of the piston 2, the pawl releasing itself through the action of the weight 17, as soon as the rod 4 begins to move away from it. If the engine is to be reversed, the reversing lever 12 is thrown completely over to the stop 22, and the D valve 7 will then remain in its lowermost position with pressure flowing to the top of the piston until the valve is restored to the middle position shown in Fig. 1 through the action of the lever 9 and its connections. If it is desired to link up the engine when thus reversed, the reversing lever 12 is moved the desired distance away from the stop 22, thus admitting pressure to the under side of the piston 2 until the desired movement has taken place, after which the lower pawl 15 may be operated by the lever 18, and will be engaged, as above described, with one of the teeth or notches 20 where it will be held by the reversing action which is caused by restoring the reversing lever 12 to its full speed astern position, viz., in contact with the stop 22.

What I claim is:

1. In a pressure operated reversing gear, the combination with a motor having a reversing valve and means for automatically closing said reversing valve; of a mechanical holding device adapted to hold the said reversing gear in intermediate positions; means for manually operating said holding device to move it to its holding position; and means whereby said holding device is automatically released when the motor is reversed.

2. In a pressure operated reversing gear, a cylinder; a piston therein connected with the reversing gear; a valve controlling the admission of pressure to said cylinder; a reversing lever to operate said valve; equalizing connecting mechanism between said valve and said reversing gear, whereby said valve is automatically controlled by the piston movement; a locking device for holding the piston in intermediate positions when the valve is open; and means whereby the pressure on the piston causes said locking device to remain in locking position.

3. In a pressure operated reversing gear, a cylinder; a piston therein connected with the reversing gear; a valve controlling the admission of pressure to said cylinder; a reversing lever to operate said valve; equalizing connecting mechanism between said valve and said reversing gear, whereby said valve is automatically controlled by the piston movement; and means whereby said locking device is held locked by pressure on the piston in one direction and automatically released by pressure on the piston in the other direction.

4. In a pressure operated reversing gear, a cylinder; a piston therein connected with the reversing gear; a valve controlling the admission of pressure to said cylinder; a reversing lever to operate said valve; equalizing connecting mechanism between said valve and said reversing gear, whereby said valve is automatically controlled by the movement of the piston; oppositely disposed teeth carried by the reversing gear; weighted pawls adapted to engage said teeth when the gear is in linked-up position for ahead or reverse; and means for manually moving said pawls into locking position.

In testimony whereof, I have signed my name to this specification in the presence of two subscribing witnesses.

EDWARD P. ROBINSON.

Witnesses:
 JAS. J. MALONEY,
 M. E. COVENEY.